L. C. CLARK.
Whip Socket.

No. 9,354. Reissued Aug. 24, 1880.

Witnesses.
John Edwards Jr.
Edward Magnus

Inventor.
Lucas C. Clark
By James Shepard
Atty.

N. PETERS, PHOTO-LITHOGRAPHER, WASHINGTON, D. C.

UNITED STATES PATENT OFFICE.

LUCAS C. CLARK, OF PLANTSVILLE, CONNECTICUT.

WHIP-SOCKET.

SPECIFICATION forming part of Reissued Letters Patent No. 9,354, dated August 24, 1880.

Original No. 123,769, dated February 20, 1872. Application for reissue filed July 8, 1880.

*To all whom it may concern:*

Be it known that I, LUCAS C. CLARK, of Plantsville, in the county of Hartford and State of Connecticut, have invented certain new and useful Improvements in Whip-Sockets, of which the following is a specification.

My invention consists in a whip-socket having an elastic cushion with open spaces at a point between the inner walls of the socket and the space designed to be occupied by the whip; also, in the various details of the same; and, also, in an improved attachment for securing the cushion to the socket, all as hereinafter described.

Figure 1:
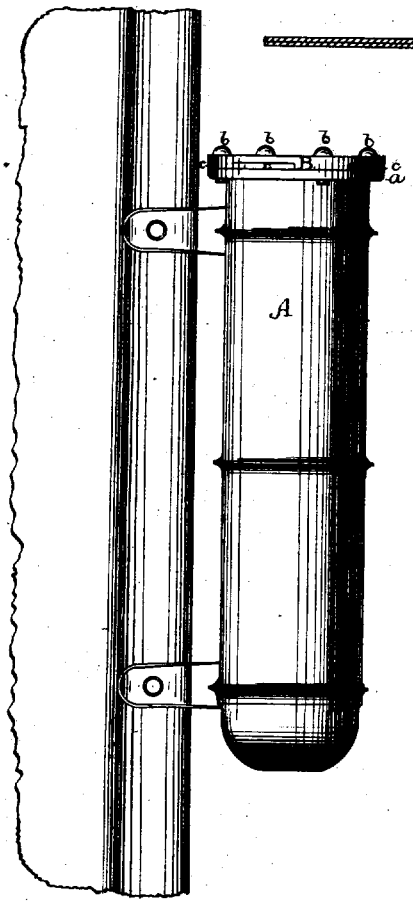
Figure 2:
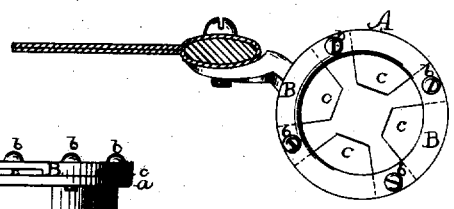

In the accompanying drawings, Figure 1 is a side elevation of a whip-socket which embodies my invention. Fig. 2 is a top view of the same.

A designates a whip-socket, which may be made of any material and in any desired design. In the present instance the mouth of the socket A is provided with a rim, *a*, to which rim the cap B is secured by means of screws *b* or other suitable fastening.

The elastic cushion is formed of two or more arms, *c c*, of rubber, leather, or suitable soft elastic material, which arms are placed at some little distance from each other, so as to leave considerable space between them and so as to extend directly inward partially across the mouth of the socket A. The pieces of rubber or other material upon which said arms are formed are placed with one end under the cap B. They are secured in place by compression between the cap B and the rim *a* at the upper end of the socket.

The ends of the arms *c c* constitute the part of the cushion which comes in contact with the whip, and the open space between the arms isolates them and makes them independent of each other, and, furthermore, allows the stock composing the cushion to be compressed and deflected in any direction much more readily than would be the case if there were no spaces left between the whip and the inner walls of the socket surrounding it. These arms are made in separate pieces in order to effect a great saving in material, and that the large end of the piece upon which they are formed may rest in the slots in the rim *a*, so that the screws *b* shall pass between them, and that by simply loosening the screws one or all of the arms *c c* can be removed and replaced by new ones.

The manner of securing the cushion to the socket is immaterial to the first part of my invention, the most essential feature of which first part is the open spaces which allow the cushion to be readily deflected in use.

The advantages of my invention over the rubber washer or collar now in common use are, that the device may be made from a smaller amount of stock, and consequently at a less price; that the cushion having the open spaces surrounding its whip-bearing surface will allow the whip to pass through it with greater ease and less wear of the rubber; that the isolation of said arms admits of thicker rubber being used and still allows the whip to be easily inserted; that the isolation of the arms at their whip-bearing ends allows leather to be used as a substitute for rubber, which it would be impossible to do with a solid collar or with one having no spaces; that by loosening the cap one or all of the arms may be removed and replaced by new ones when desired, thus always insuring perfect protection of the whip.

I claim as my invention—

1. A whip-socket having an elastic cushion with open spaces at a point between the inner walls of the socket and the space designed to be occupied by the whip, substantially as described, and for the purpose specified.

2. The arms *c c* at the mouth of a whip-socket, isolated from each other by a space at their whip-bearing ends, substantially as described, and for the purpose specified.

3. The removable cap B and its screws *b*, in combination with the cushion or arms *c c*, rim *a*, and socket A, all substantially as described, and for the purpose specified.

4. The combination of a whip-socket with the independent arms *c c*, substantially as described, and for the purpose specified.

LUCAS C. CLARK.

Witnesses:
JAMES SHEPARD,
JOHN EDWARDS, Jr.